United States Patent
Wu

(10) Patent No.: US 9,086,930 B2
(45) Date of Patent: Jul. 21, 2015

(54) SYSTEM AND ELECTRONIC DEVICE FOR UTILIZING MEMORY OF VIDEO CARD

(71) Applicant: Hon Hai Precision Industry Co., Ltd., New Taipei (TW)

(72) Inventor: Chih-Huang Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 63 days.

(21) Appl. No.: 14/011,693

(22) Filed: Aug. 27, 2013

(65) Prior Publication Data

US 2014/0189271 A1    Jul. 3, 2014

(30) Foreign Application Priority Data

Dec. 27, 2012   (TW) .............................. 101150332 A

(51) Int. Cl.
| | |
|---|---|
| G06F 13/38 | (2006.01) |
| G06F 9/50 | (2006.01) |
| G06F 11/14 | (2006.01) |
| G06F 3/06 | (2006.01) |
| G06F 11/20 | (2006.01) |

(52) U.S. Cl.
CPC ............ G06F 9/5077 (2013.01); G06F 9/5016 (2013.01); G06F 11/1441 (2013.01); G06F 11/2015 (2013.01)

(58) Field of Classification Search
None
See application file for complete search history.

(56) References Cited

U.S. PATENT DOCUMENTS

| | | | |
|---|---|---|---|
| 2007/0162624 A1* | 7/2007 | Tamasi et al. ..................... | 710/8 |
| 2012/0137102 A1* | 5/2012 | Perumanam et al. .......... | 711/170 |

* cited by examiner

*Primary Examiner* — Scott Sun
(74) *Attorney, Agent, or Firm* — Novak Druce Connolly Bove + Quigg LLP

(57) ABSTRACT

A control system for utilizing a memory of a video card of an electronic device is executed by a control unit of the electronic device. The control system includes storage space dividing module and a storage control module. The storage space dividing module divides the memory of the video to a first storage space and a second storage space according to a division proportion, the first storage space is defined to store graphics data temporarily and the second storage space is defined to store particular data. The storage control module determines a size of the second storage space, and obtains the particular data a size less than the size of the second storage space from the storage unit, and stores the particular data into the second storage space.

20 Claims, 3 Drawing Sheets

SYSTEM AND ELECTRONIC DEVICE FOR UTILIZING MEMORY OF VIDEO CARD

BACKGROUND

1. Technical Field

The present disclosure relates to video cards, and particularly to a system and an electronic device for utilizing memory of a video card.

2. Description of Related Art

Electronic devices, such as tablet computers, portable computers, usually have video cards, and a memory of one video card usually has a space of several hundred or thousand megabits. However, when the electronic device is working normally, most of space of the memory of the video card are not being utilized, which cause a waste of the memory of the video card.

A system and an electronic device to overcome the described limitations are thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the accompanying drawings.

Figure 1:
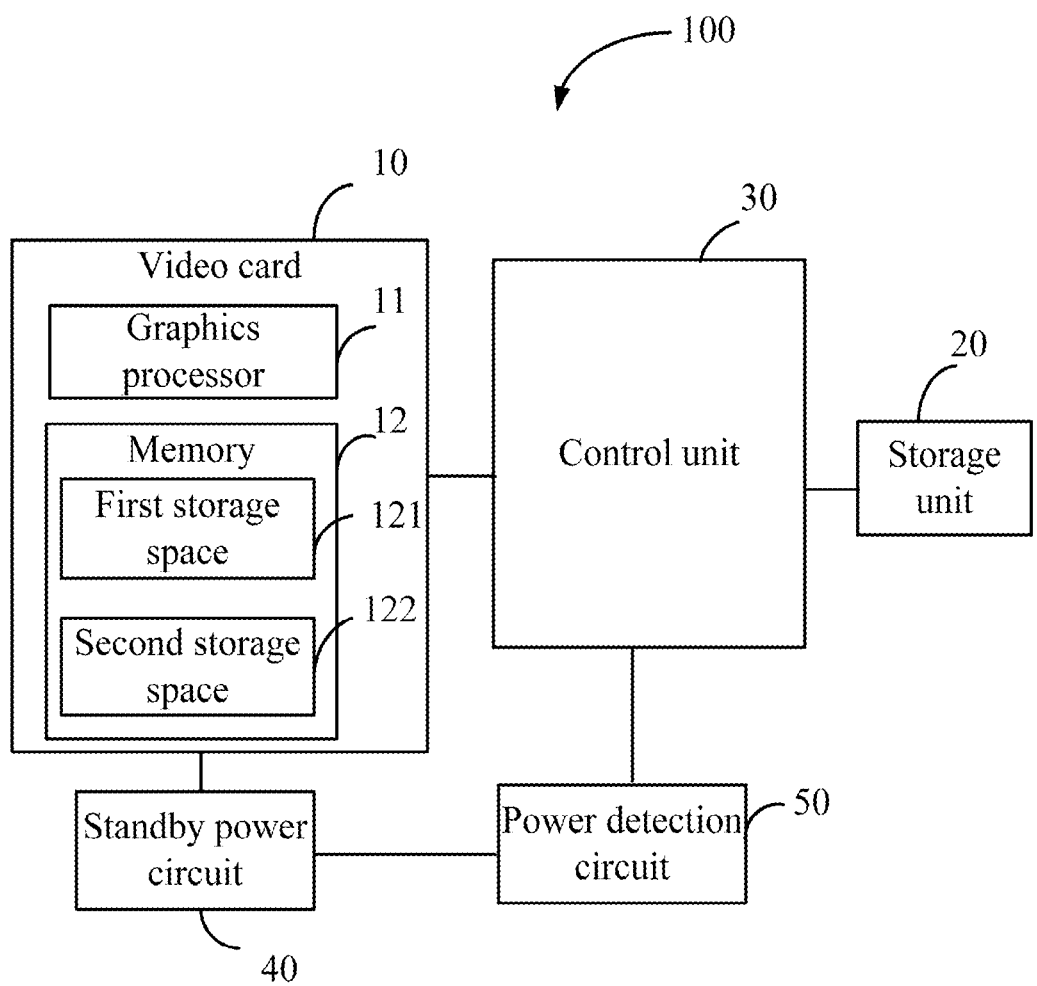
FIG. 1 is a block diagram of an embodiment of an electronic device with a video card.

FIG. 1 illustrates a block diagram of an embodiment of an electronic device 100. The electronic device 100 includes a video card 10, a storage unit 20, and a control unit 30. The electronic device 100 can utilize the video card 10 to store data.

The video card 10 includes a graphics processor 11 and a memory 12. The graphics processor 11 is used to process graphics data, and the memory 20 is used to store the graphics data temporarily. The storage unit 20 stores a number of data, such as system files, audio files, video files, and digital pictures, for example. The storage unit 20 can be a hard disk, or a compact disc, for example.

Figure 2:
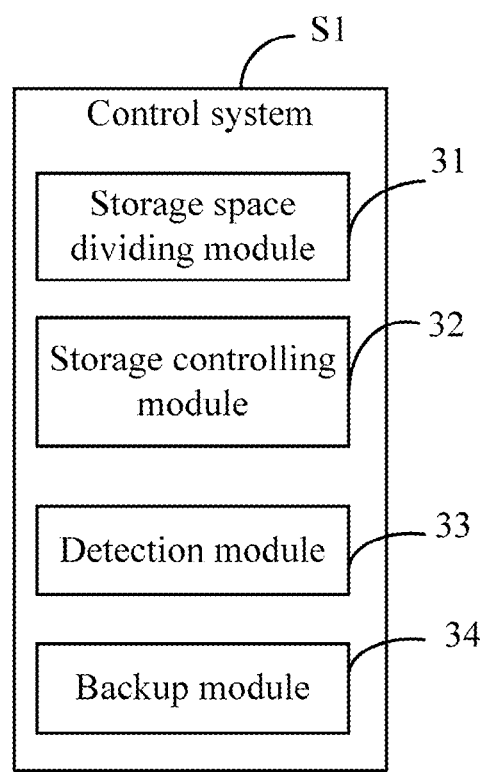
FIG. 2 is a block diagram of an embodiment of a system for utilizing a memory of a video card.

FIG. 2 show that the control unit 30 is connected between the video card 10 and the storage unit 20, the control unit 30 is used to run/execute a control system S1 for utilizing the memory 20 of the video card 10.

As shown in FIG. 2, the control system Si includes a storage space dividing module 31, a storage controlling module 32, a detection module 33, and a backup module 34 which are collection of software instructions. The storage space dividing module 31 is used to divide the memory 12 to a first storage space 121 and a second storage space 122 according to a division proportion. In the embodiment, the division proportion is a ratio between a size of the first storage space 121 and a size of the second storage space 122. For example, if the division proportion is 3:2, the size of the first storage space 121 divided by the storage space dividing module 31 is sixty percent of that the memory 12, and the size of the second storage space 122 divided by the storage space dividing module 31 is forty percent of that of the memory 12. In the embodiment, the division proportion is determined by the storage space dividing module 31 and the detection unit 33 as below.

In the embodiment, the first storage space 121 is defined to store the graphics data as the previous function of the memory 12, and the second storage space 122 is defined to store particular data. In the embodiment, the particular data are system files running when the electronic device 100 is being started up. In another embodiment, the particular data can be media files, such as video files, audio files, and digital pictures.

The storage control module 32 is used to determine the size of the second storage space 122 and obtain corresponding particular data from the storage unit 20 with a size less than the size of the second storage space 122, and then stores the particular data into the second storage space 122.

In the embodiment, the division proportion is determined before the storage space dividing module 31 divides the memory 12 as below.

The detection module 33 is used to detect an occupancy rate of the memory 12 periodically, and produce a detection record after the detection module 33 has detected the occupancy rate of the memory 12 for a predetermined times (such as 100 times). The storage space dividing module 31 determines the division proportion according to the detection record. In detail, the storage space dividing module 31 obtains a maximum occupancy rate from the detection record, and sets the obtained maximum occupancy rate as a ratio between the size of the first storage space 121 and the size of the memory 12, and then obtains the division proportion. For example, if the maximum occupancy rate of the all detected occupancy rate of the detection record is 80%, the storage space dividing module 31 set the ratio between the first storage space 121 and the memory 12 is 80%, then a ratio between the size of the second storage space 122 and the memory 12 is obviously 20%, and then the storage space dividing module 31 determines the division proportion is 80%: 20%=4:1. In further another embodiment, the storage space dividing module 31 calculates an average occupancy rate of all of detected occupancy rates in the detection record, and sets the average occupancy rate of the detection record as the ratio between the size of the first storage space 121 and the size of the memory 12, thus to determine the division proportion.

In the embodiment, the detection module 33 is also used to detect an occupancy rate of the first storage space 121 periodically, such as, every 1 hour. When the detection module 33 detects the occupancy rate of the first storage space 121 is greater than a first predetermined value (such as 80%), the detection module 33 produces a first detection signal. When the detection module 33 detects the occupancy rate of the first storage space 121 is less than a second predetermined value (such as 40%), the detection module 33 produces a second detection signal.

The storage space dividing module 31 is also used to receive the first detection signal and the second detection signal, and increase the division proportion and divide the memory 12 according to the increased division proportion when determining an amount of the first detection signal received from the detection module 33 is greater than a first predetermined number (such as, 20) during a predetermined time period, such as 10 days. That is, the storage space dividing module 31 increases the size of the first storage space 121 and decreases the size of the second storage space 122.

The storage space dividing module 31 is also used to decrease the division proportion and divide the memory 12 according the decreased division proportion when determining an amount of the second detection signal received from the detection module 33 is greater than a second predetermined number (such as, 40) during the predetermined time period. That is, the storage space dividing module 31 decreases the size of the first storage space 121 and increases the size of the second storage space 122. In the embodiment, the first predetermined value is greater than the second predetermined value.

After the storage space dividing module 31 divides the memory 12 according to the updated division proportion, the storage controlling module 32 determines the size of the second storage space 122 currently, and obtains the particular data with the size less than the size of the second storage space 122 from the storage unit 20, and then stores the obtained particular data into the second storage space 122.

In the embodiment, the electronic device 100 also includes a standby power circuit 40, the standby power circuit 40 is used to maintain power to the video card 10 when the electronic device 100 is shut down. Thus, the particular data stored in the second storage space 122 of the memory 12 can be maintained when the electronic device 100 is shut down. The standby power circuit 40 can be a battery, such as a button battery powering a clock unit (not shown) of the electronic device 100.

In the embodiment, the electronic device 100 also includes a power detection circuit 50. The power detection unit 50 is used to detect the charge remaining in the standby power circuit 40. The backup module 34 backups the particular data in the second storage space 122 to the storage unit 20 when the power detection circuit 50 detects the charge remaining in the standby power circuit 40 is less than a predetermined value, such as 40%.

Figure 3:
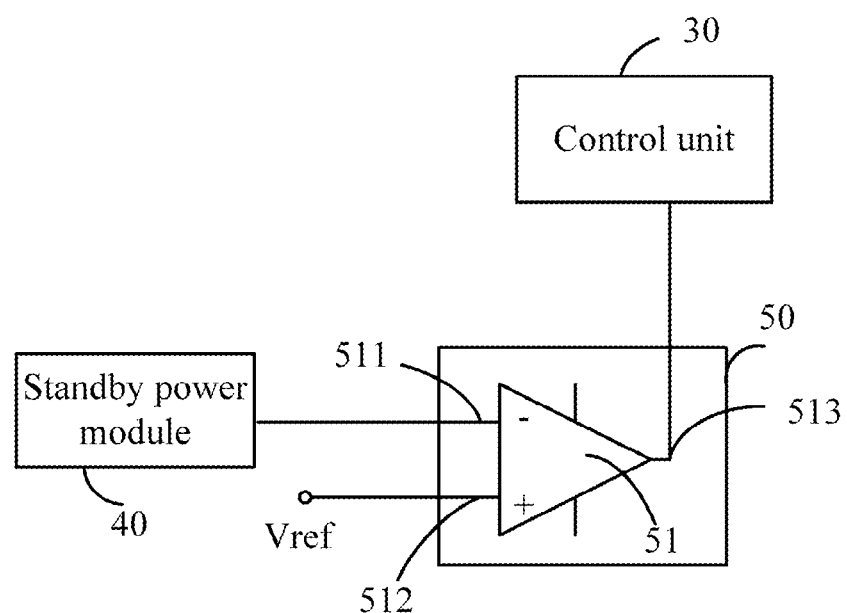
FIG. 3 is a circuit diagram of an embodiment of a power detection circuit of an electronic device with a video card.

FIG. 3 shows that the power detection circuit 50 includes a voltage comparator 51. The voltage comparator 51 includes a non-inverting input port 511, an inverting input port 512, and an output port 513. The non-inverting input port 511 is connected to the standby power circuit 40 and receives a voltage of the standby power circuit 40. The inverting input port 512 is connected to a reference voltage Vref, and the output port 513 is connected to the control unit 30.

The voltage comparator 51 compares a voltage of the standby power circuit 40 and the reference voltage Vref to determine whether the charge remaining in the standby power circuit 40 is less than the predetermined value.

In the embodiment, the voltage comparator 51 determines the charge remaining in the standby power circuit 40 is less than the predetermined value and produces a backup trigger signal when comparing the voltage of the standby power circuit 40 is less than the reference voltage. The backup module 34 backups the particular data in the second storage space 122 to the storage unit 20 when receiving the backup trigger signal. In the embodiment, the backup trigger signal is a low voltage level signal.

In another embodiment, the backup trigger signal is an off signal produced when the electronic device is shut down. Thus, the backup module 34 backups the particular data in the second storage space 122 to the storage unit 20 after the electronic device 100 is turned off.

The control unit 30 can be one or more processors, a single chip, or a field programmable gate array chip. The control system Si is a program run by the control unit 30. In another embodiment, the control system Si can be run by the video chip 10 and the control unit 30 can be omitted.

The electronic device 100 can be a table computer, a desktop computer, a portable computer, a server, or any device including a video chip.

It is understood that the present embodiments and their advantages will be understood from the foregoing description, and various changes may be made thereto without departing from the spirit and scope of the disclosure or sacrificing all of its material advantages, the examples hereinbefore described merely being embodiments of the present disclosure.

What is claimed is:

1. A control system for utilizing a memory of a video card of an electronic device, the control system comprising:
    a control unit; and
    a plurality of modules to be executed by the control unit; the modules comprising:
    a storage space dividing module, configured to divide the memory of the video card to a first storage space and a second storage space according to a division proportion, wherein the first storage space is defined to store graphics data temporarily, the second storage space is defined to store particular data; and
    a storage control module, configured to determine a size of the second storage space, and obtain the particular data with a size less than the size of the second storage space from the storage unit, and store the particular data into the second storage space.

2. The control system according to claim 1, wherein the modules further comprise a detection module configured to detect an occupancy rate of the memory periodically, and produce a detection record after the detection module has detected the occupancy rate of the memory for a predetermined times, the storage space dividing module determines the division proportion according to the detection record and then divides the memory according to the division proportion.

3. The control system according to claim 2, wherein the storage space dividing module obtains a maximum occupancy rate from the detection record and sets the maximum occupancy rate as a ratio between a size of the first storage space and a size of the memory to determine the division proportion.

4. The control system according to claim 2, wherein the storage space dividing module calculates an average occupancy rate of all of detected occupancy rates in the detection record, and sets the average occupancy rate as the ratio between a size of the first storage space and a size of the memory to determine the division proportion.

5. The control system according to claim 2, wherein the detection module further detects an occupancy rate of the first storage space periodically, wherein, when the detection module detects the occupancy rate of the first storage space is greater than a first predetermined value, the detection module produces a first detection signal; when the detection module detects the occupancy rate of the first storage space is less than a second predetermined value, the detection module produces a second detection signal.

6. The control system according to claim 5, wherein the storage space dividing module is further configured to increase the division proportion and divide the memory according the increased division proportion when determining an amount of the first detection signal received from the detection module is greater than a first predetermined number during a predetermined time period; and decrease the division proportion and divide the memory according the decreased division proportion when determining an amount of the second detection signal received from the detection module is greater than a second predetermined number during the predetermined time period.

7. The control system according to claim 5, wherein the storage controlling module determines the size of the second storage space currently, after the storage space dividing module divides the memory according to the updated division proportion, and obtains the particular data with the size less than the size of the second storage space from the storage unit, and then stores the obtained particular data into the second storage space.

8. The control system according to claim 1, further comprising a backup module configured to backup the particular data in the second storage space to a storage unit of the electronic device, when receiving a backup trigger signal.

9. The control system according to claim 1, wherein the particular data are system files or media files.

10. An electronic device, comprising
a video card comprising a memory;
a storage unit; and
a control unit, configured to execute a storage space dividing module and a storage control module;
wherein, the storage space dividing module is configured to divide the memory of the video to a first storage space and a second storage space according to a division proportion, wherein the first storage space is defined to store graphics data temporarily, the second storage space is defined to store particular data; and the storage control module is configured to determine a size of the second storage space and obtain the particular data a size less than the size of the second storage space from the storage unit, and store the particular data into the second storage space.

11. The electronic device according to claim 10, wherein the control unit is further configured to execute a detection module, the detection module is configured to detect an occupancy rate of the memory periodically, and produce a detection record after the detection module has detected the occupancy rate of the memory for a predetermined times, the storage space dividing module determines the division proportion according to the detection record and then divides the memory according to the division proportion.

12. The electronic device according to claim 11, wherein the storage space dividing module obtains a maximum occupancy rate from the detection record and sets the maximum occupancy rate as a ratio between a size of the first storage space and a size of the memory to determine the division proportion.

13. The electronic device according to claim 11, wherein the storage space dividing module calculates an average occupancy rate of all of detected occupancy rates in the detection record, and sets the average occupancy rate as the ratio between the a size of the first storage space and a size of the memory to determine the division proportion.

14. The electronic device according to claim 11, wherein the detection module further detects an occupancy rate of the first storage space periodically; wherein when the detection module detects the occupancy rate of the first storage space is greater than a first predetermined value, the detection module produces a first detection signal; when the detection module detects the occupancy rate of the first storage space is less than a second predetermined value, the detection module produces a second detection signal.

15. The electronic device circuit according to claim 14, wherein the storage space dividing module is further configured to increases the division proportion and divide the memory according the increased division proportion when determining an amount of the first detection signal received from the detection module is greater than a first predetermined number during a predetermined time period; and decrease the division proportion and divide the memory according the decreased division proportion when determining an amount of the second detection signal received from the detection module is greater than a second predetermined number during the predetermined time period.

16. The electronic device according to claim 14, wherein the storage controlling module determines the size of the second storage space currently, after the storage space dividing module divides the memory according to the updated division proportion, and obtains the particular data with the size less than the size of the second storage space from the storage unit, and then stores the obtained particular data into the second storage space.

17. The electronic device according to claim 10, further comprising a standby power circuit configured to maintain power to the video card when the electronic device is shut down.

18. The electronic device according to claim 17, further comprising a power detection circuit configured to detect charge remaining in the standby power circuit.

19. The electronic device according to claim 18, wherein the control unit further executes a backup module configured to backup the particular data in the second storage space to the storage unit when the power detection circuit detects the charge remaining in the standby power circuit is less than a third predetermined value.

20. The electronic device according to claim 19, wherein the power detection circuit comprises a voltage comparator, the voltage comparator comprises a non-inverting input port, an inverting input port, and an output port, the non-inverting input port is connected to the standby power circuit and receives a voltage of the standby power circuit, the inverting input port is connected to a reference voltage, the output port is connected to control unit, the voltage comparator determines the charge remaining in the standby power circuit is less than the predetermined value and produces a backup trigger signal when comparing the voltage of the standby power circuit is less than the reference voltage; the backup module backups the particular data in the second storage space to the storage unit when receiving the backup trigger signal.

* * * * *